Nov. 18, 1958 — A. T. PITMAN — 2,860,569
COOKING APPARATUS
Filed Sept. 27, 1955

INVENTOR
Alfred T. Pitman
BY Shreve, Crowe & Gordon
ATTORNEYS

United States Patent Office 2,860,569
Patented Nov. 18, 1958

2,860,569
COOKING APPARATUS
Alfred T. Pitman, Fairburn, Ga.
Application September 27, 1955, Serial No. 536,878
6 Claims. (Cl. 99—404)

The present invention provides certain improvements in cooking equipment, and, more particularly, provide improvements in so-called "deep-frying" apparatus which may be either readily portable for domestic service, or for a large capacity commercial use.

In accordance with the present invention, there is provided an automatic type of deep-fat frying equipment which employs as a cooking or frying unit a cylindrical deep-frying drum or tank having a closed end and an open discharge end, the said tank enclosing conveyor means which is operative to convey articles of food through a cooking bath of molten fat or hot edible oil which decreases uniformly in depth and terminates short of the open discharge end for enabling the cooked items of food to be drained of major portions of adhering cooking medium prior to such cooked items being discharged through the open end of the tank by the conveyor means.

A further object of the invention is to provide improved conveyor means for the cylindrical cooking tank, wherein the conveyor means is a rotary screw conveyor adapted to be partially immersed in the heated cooking medium and continuously moving the items of food therethrough towards the open discharge end of the tank at a controlled rate of speed that assures complete frying of the said items by the time they are elevated from the cooking medium at the termination thereof for drainage prior to the discharge of the items from the tank, coupled with improved means for mounting the conveyor adjacent to the closed end of the cooking tank, the mounting means being at one end only of the conveyor, namely, adjacent to the closed end of the tank, the said conveyor having a free end adjacent to the discharge end of the tank.

A still further object of the invention is to provide an improved mounting for the cylindrical cooking tank including pivotal trunnions positioned relative to the tank so that the tank will be positioned sufficiently high above a base and tilted downwardly to its closed end at a sufficiently acute angle to cause the deep-frying fat or like medium to terminate short of the open discharge end of the tank, while enabling the tank to be tilted downwardly towards its open discharge end for completely draining the liquid frying medium from the tank through the discharge end whenever desired. The driving end of the conveyor is not rigidly fastened in its mounting and is easily slipped therefrom and removed from the tank housing for purposes of cleansing or otherwise, as desired.

The said mounting means automatically receives the driving end of the conveyor shaft when dropped therein and retains it by gravity when the cooking tank is in cooking position.

A still further object of the invention is to provide improved driving means for the said conveyor whereby the conveyor may be rotated at a controlled selected variable speed which is controlled in accordance with the items of food being fried for controllably timing the rate of travel thereof through the liquid cooking medium for assuring completed deep-frying of such items when they have been conveyed through the medium.

A still further object of the invention is to provide compact heating means for the cooking cylinder or tank for maintaining the cooking medium at a closely controlled frying temperature in accordance with the kind and size of the food items being cooked.

A still further object of the invention is to provide a cylindrical cooking tank having an elongated charging hopper in upper portions of the tank and extending substantially throughout the entire length of the tank enabling charging food items into the tank and hot cooking medium at any selected location of the latter for enabling an additional control of the period of contact of food items with the cooking medium.

A still further object of the invention is to provide a guide chute and means for detachably securing the same to the cooking tank adjacent to the open discharge end of the tank, whereby deep-fried articles of food may be delivered as discharged from the open discharge end of the tank into a collection receptacle in which drainage of the said articles may be completed before dispersal and consumption thereof.

Another important object of this invention is the provision of a deep food fryer device, wherein the conveyor, the mounting for the conveyor and guard plate are readily and individually demountable for easy cleaning or replacement.

Further objects and advantages of the improved apparatus will become apparent as the description proceeds, and the features of novelty will be pointed out in particularity in the appended claims. It may be pointed out that the motor-driven screw conveyor of the improved equipment eliminates the use of fry-baskets and crumb-cleansing apparatus, and also offers definite advantages over automatic frying equipment of the conveyor type that conveys the food items through the fat on an endless belt.

This latter type has many inherent disadvantages, because there is a slipping and falling back of the food which results in uneven cooking. Cleansing difficulties also are inherent in frying equipment utilizing endless belt conveyors for the food.

The present invention will be understood more readily by a consideration of the accompanying drawings, in which.

Referring more particularly to the drawings, the improved apparatus of the present invention comprises a cylindrical cooking unit A adapted to contain a deep-frying medium, the unit A having a closed end and an open discharge end, and a removably attached discharge guide chute B for discharging deep-fried items of food into a collection receptacle C. These respective components will be referred to in detail hereinafter.

Figure 1:
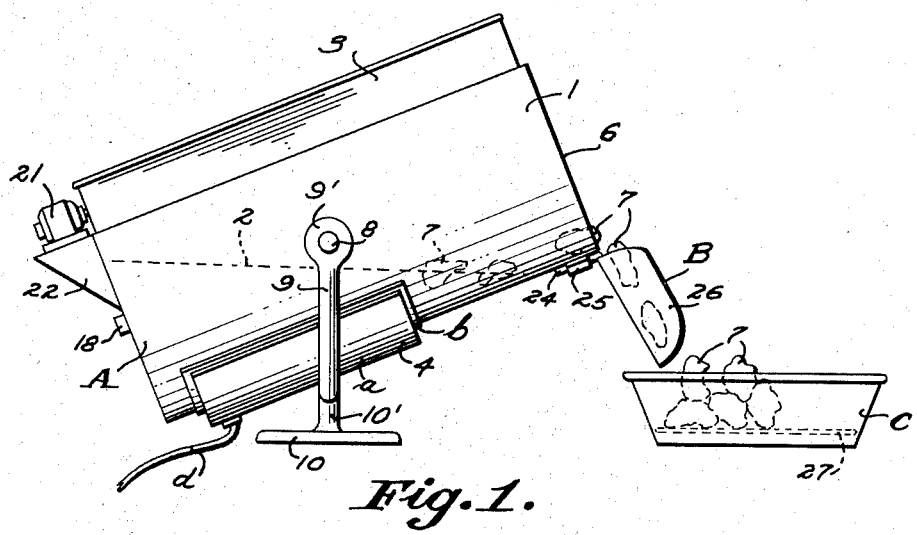
Fig. 1 is a side elevation of the improved apparatus of the present invention.
Figure 2:
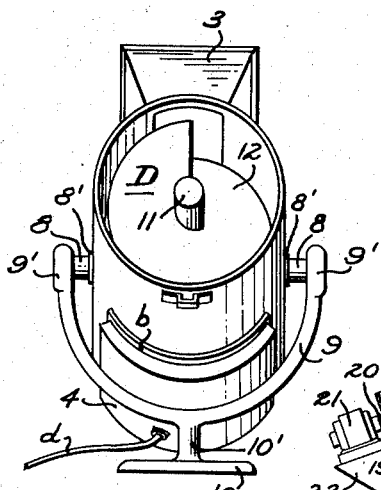
Fig. 2 is an end view of the cooking tank of Fig. 1, looking towards the left as viewed in Fig. 1.
Figure 4:
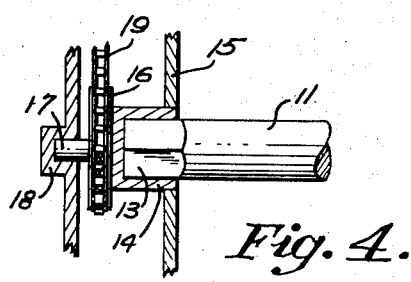
Fig. 4 is an enlarged detailed view partially in vertical section, of the drive unit mounting of the drive end of the special conveyor shaft as shown in Fig. 3.
Figure 3:
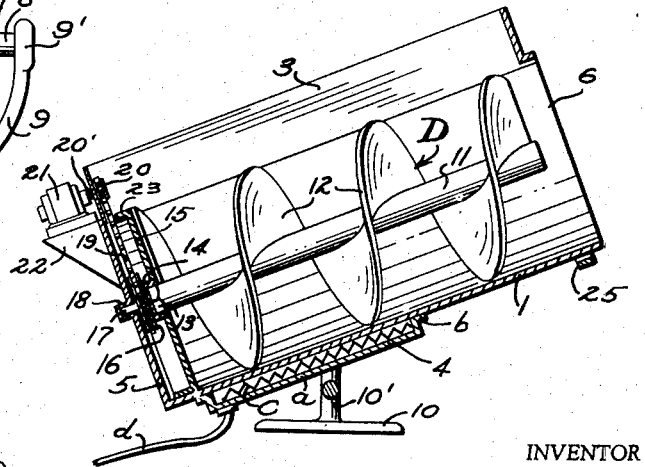
Fig. 3 is a longitudinal sectional view through the cooking tank of Fig. 1, the view being taken on the longitudinal axis of the said tank.

As will be seen from the drawings, the deep-frying unit A is a substantially cylindrical housing designated on the drawings specifically by reference numeral 1, this housing 1 containing a liquid deep-frying medium 2, the level of which is indicated by the dotted line of the drawing (Fig. 1). This deep-frying medium is molten frying fat or hot vegetable oil. The cylindrical housing 1 has in its upper portions an open charging hopper 3, the medium 2 being heated to the desired cooking temperature by a suitable heating unit 4, which is external thereof, and which is contoured similarly to the exterior of the housing 1 for snugly interfitting therewith. The casing (a) of the heater 4, in the present instance, is provided with a flange (b), which may be welded or otherwise suitably attached to the housing 1. Preferably, but not necessarily, the heater 4 is an electric heater, the usual heating element (c) and current lead in (d) being shown in connection with the casing (a) (Fig. 3). Said heater is controlled by a switch (not shown) but may be thermostatically controlled for maintaining the medium 2 at a selected constant cooking temperature according to the food items being cooked in the deep-frying fat or the like.

The cooking tank 1 is shown as having a closed end 5 and an open discharge end 6, the cooking position of the tank 1 being with the closed ned depressed and the open ned elevated (Fig. 1), the angle of the resulting tilt being such that the liquid level of the hot deep-frying medium 2 terminates sufficiently short of the discharge end, so that the deep-fried articles 7 of food will be subjected to a draining action in the tank 1 before they are actually conveyed out of the tank, and also for preventing loss of the liquid material by the same being ejected through the discharge end of the tank-housing 1. The operating angle of the tank housing 1 (Figs. 1 and 3) not only permits free removal in discharge direction of the deep-fried articles 7 from the open discharge end 6, but also permits free drainage in the opposite direction within the tank of the deep-frying medium 2 and unobstructed removal of the conveyor means D, whenever such may be desired for cleaning purposes. The conveyor means D will be referred to in greater detail hereinafter, as well as the improved and simplified mounting and driving means therefor.

As has been mentioned previously above, the mounting of the cylindrical housing 1, is an important feature of the present invention. Thus, as is shown on the drawings, the housing or tank 1 is mounted pivotally on opposite lateral pivot trunnions 8 engageable in the upper ends 9' of opposite upwardly diverging bracket slightly resilient arms 9 which with the post 10' of the base 10 supports the housing 1 sufficiently high above the base to enable the said housing to be tilted sufficiently to produce the desired results. The trunnions 8 are welded or otherwise secured to the housing by means of the flange 8' and are positioned with reference to the cylindrical housing 1 so that while in operative position the housing is in stable position when the closed end is depressed and the open end elevated, the weight of the cooking medium and conveyor means increasing the stability of this position. The reversal of the direction of slope of the housing 1 with the open discharge end depressed for draining the liquid contents and for removing the conveyor may be accomplished manually whenever desired.

Additional important features of the present apparatus reside in the conveying means and the mounting arrangement provided for such means. As will be seen from the drawings, the conveying means D includes a shaft 11, which carries a continuous spiral conveyor vane 12, the diameter of which is substantially equal to the internal diameter of the housing 1, the shaft 11 with its spiral vane 12 constitutes the screw-conveyor D which is mounted in the housing 1 at its inner end, and rotates in the cooking medium 2 and towards the open discharge end of the housing for propelling the articles of food 7 through the deep-frying fat or vegetable oil 2 and out through the open discharge end 6 of the housing 1. The end of the conveyor at the open discharge end 6 of the housing 1 is a free end. The shaft 11 of the conveyor is concentric throughout relative to the interior of the housing 1, so that the slope of the conveyor corresponds to that of the housing.

It will be seen from the drawings that the inner, or mounted end of the conveyor shaft 11 is square in shape, as is indicated at 13, which square end is received in an interiorly square socket member 14, the end 13 and socket 14 having a slip fit, the weight of the conveyor retaining the end 13 in the socket 14 when the housing 1 is in operative cooking position.

The interiorly square socket member 14 is externally round, and rotates in a centrally disposed opening provided therefor in a guard plate 15 which is positioned in the housing 1 adjacent to the closed end thereof, but is maintained suitably spaced therefrom by provision of an annular flange, designated at 23, which extends around the periphery of the guard plate 15, and which will be referred to further hereinafter. The plate 15 is held in position in the interior of the housing 1 by frictional engagement of its periphery and the said flange with the interior wall of the housing. This plate 15 is a guard plate for a driving sprocket 16 of which the aforesaid socket member 14 is a part of the axle and rotates with the sprocket 16 for rotating the screw-conveyor. The plate 15 prevents flow of the cooking bath 2 beyond said plate, and also said plate is adapted to be wiped by the spiral vane 12 for dislodging therefrom any crumbs or food particles which may have a tendency to adhere thereto.

As has been stated above, the socket member 14 freely interfits with the square end 13 of the conveyor shaft shaft 11, and constitutes an integral part of the mounting axle for the sprocket 16, such axle being completed by a round stub shaft 17 which is integral with the socket portion 14 and is mounted in a bearing socket 18 on the end closure 5 of the housing 1. The sprocket 16 is driven by sprocket chain 19 which passes around sprocket 16 and also around a drive sprocket 20 that is mounted on shaft 20' of a variable speed motor 21 which is shown as being carried by a bracket 22 suitably mounted on the closed end 5 of the housing 1. The flange 23 on the plate 15 maintains proper spacing between the closed end of the housing 1 and the said plate 15, the flange 23 also maintaining the plate 15 in its proper position in the housing 1 through frictional contact with the inner wall of the housing.

The motor 21, being a variable speed motor, is controlled by a switch (not shown) so as to vary the speed of rotation of the conveyor in accordance with the frying time required for thorough cooking of a given food material. As has been mentioned previously herein, the level of the frying bath 2 terminates short of the elevated discharge end of the tank 1, so that the pieces 7 of the material being fried will be moved completely out of the bath 2 before the conveyor discharges them out of the housing, so that the resulting fried articles 7 will be freed of at least the major portion of adhering frying material prior to discharge of the finished fried articles 7 of food through the open end 6 of the housing 1. Additionally it may be noted that the charging hopper 3 preferably is an elongated hopper substantially coincident in length with that of housing 1, and advantage may be taken of such length of the hopper to additionally variably control the length of time a given food material is in contact with the bath 2 while the motor 21 is running at a constant speed, such length of time being controllably varied and determined by the location of charging of such material through the elongated hopper, it being apparent that the charging of such material into the bath 2 through the said hopper 3 subjects the material to the bath 2 for progressively shorter times the nearer it is introduced through the hopper towards the open discharge end 6 of the housing 1. There may be processed simultaneously in such manner different materials or condiments having different cooking periods, which, of course, would be discharged together through the discharge end 6 of the housing 1.

It will be apparent also that the food materials 7 and the hot liquid bath 2 are thoroughly agitated and tumbled together in a highly intimate manner by the action of the conveyor as the articles 7 of the food are propelled through the bath 2 and housing 1.

As has been indicated above while the heating unit 4 is shown as being an electric heater, it is obvious that such may be replaced by a thermostatically controlled gas heater composed of one or more Bunsen-type of burners for maintaining the bath 2 at the required deep-frying temperature.

As will be seen from the drawings, when the housing 1 is in cooking position and sloping downwardly to its closed end 5, a guide chute 8 is attached removably to the housing 1 adjacent to the discharge end 6 for guiding the finished deep-fitted articles 7 of food from the housing 1 into a collecting receiver C, as the said articles 7 are delivered through the discharge end 6 by the conveyor.

The guide chute B is removably attached to the housing 1 by means of an attaching tongue 24 which is suitably secured firmly to the bottom portion of the guide chute B. This tongue 24 is slipped through, and is frictionally held by a strap 25, welded or otherwise securely affixed to the underside of the housing 1, and has a substantially right-angle bend therein so that the guide chute B extends downwardly from the discharge end 6 of the housing 1 at approximately right angles to the said housing. Similar upstanding sides 26 of the chute cooperate with the bottom thereof for directing the completely fried articles 7 of food into a drainage and collecting receptacle C which has a reticulated false drainage bottom 27 therein, on which complete drainage of the articles 7 is effected as such become collected for sale or distribution. It will be apparent that when the direction of the slope or tilt of the housing 1 is to be changed the guide chute B may be demounted before such reversal of direction of slope is effected, simply by pulling tongue 24 out from the strap 25.

While the foregoing detailed description and the accompanying drawings represents a preferred embodiment of the present invention, it will be apparent that various structural details of the cooking or frying apparatus of this invention may be varied and modified without departing from the inventive concept, so that it is to be understood that it is intended and desired to embrace within the scope of the invention such modifications and changes as may be necessary or desired to adapt it to varying conditions and uses, as defined in the appended claims.

Having thus described my invention what I desire protected by Letters Patent is as set forth in the following claims:

1. A cooking apparatus comprising, in combination, a cooking unit for receiving articles of food to be cooked, the unit including a housing having a closed end and a discharge end having a discharge opening therethrough, pivotal trunnion mounting means for the housing for selectively tilting the housing downwardly from the discharge end to the closed end for cooking operations and from the closed end to the discharge end for draining and cleaning, rotary conveyor means in the housing for conveying articles of food being cooked through the housing, means adjacent to the closed end of the housing for gravitationally mounting the conveyor means at an end thereof, the said conveyor means having an opposite free end adjacent to the discharge end of the housing, the weight of the conveying means retaining the said conveying means in its mounting means while the housing is tilted downwardly towards its closed end, the mounting means gravitationally releasing the conveying means responsively to reverse tilting of the housing on its pivotal trunnion mounting means so that the discharge end of the housing becomes depressed and the closed end raised, the conveying means being adapted to slide out by gravity from the housing through the discharge end, and driving means for rotating the conveying means at a selected variable speed, the said driving means for the conveying means including a sprocket mounted in the housing adjacent to the closed end, a variable speed motor mounted on the housing exteriorly thereof, and having a shaft, a second sprocket on the said shaft, and a driving chain interconnecting the second sprocket with the first-mentioned sprocket for effecting rotation of the conveying means responsively to actuation of the motor.

2. A cooking apparatus as claimed in claim 1, wherein the conveyor means include a shaft and a continuous spiral vane on the shaft for engaging articles of food being cooked and turbulently conveying the said articles during cooking thereof through the housing to the discharge end, a plate within the housing having an opening therethrough, the mounting means for the conveyor including a sprocket member extending through the plate opening for receiving an end of the conveyor shaft and gravitationally retaining the end of the shaft during cooking operations, a driving sprocket operatively connected to the conveyor shaft through the socket member and mounted intermediate the plate and the closed end of the housing, variable-speed driving means for the sprocket mounted externally of the housing and extending beyond the housing closed end, the socket member being a portion of a mounting axle for the sprocket, a stub shaft completing the said axle and being integral with the socket member and projecting from the sprocket opposite to the socket member, and a bearing socket extending outwardly from the closed end of the housing for rotatably receiving the stub shaft of the sprocket axle.

3. A cooking apparatus as claimed in claim 2, wherein the housing is tilted downwardly to its closed end with its discharge end elevated and contains a liquid deep-frying bath for deep-frying articles of food introduced therein, and wherein the conveyor means include a rotary screw conveyor entering the deep-frying bath and mounting means for the conveyor at an end thereof adjacent to the closed end of the housing, the conveyor having an opposite free end adjacent to the discharge end of the housing, the said bath having its liquid level terminating a substantial distance short of the elevated discharge end of the housing, whereby deep-fried articles of food become drained of the adhering liquid bath prior to discharge of the said articles by the conveyor through its discharge end.

4. A cooking apparatus as claimed in claim 3 wherein the housing has its discharge end completely open for enabling complete drainage of the cooking bath from the housing and also gravitational release and ejection of the conveyor through the open discharge end of the housing responsively to directional reversal of the tilt of the housing on its pivotal mounting for enabling ready access to the interior of the housing for cleaning.

5. A cooking apparatus as claimed in claim 2, wherein the plate in which the conveyor shaft is mounted also is wipingly engaged by the spiral vane of the conveyor during rotation of the conveyor for dislodging any portions of the articles being cooked having tendency to adhere to the plate during cooking operations.

6. A cooking apparatus comprising, in combination, a cooking unit including a charging hopper for receiving articles of food to be cooked, the said unit including a housing communicating with said hopper and having a closed end and an open discharge end and adapted to contain a liquid cooking bath, mounting means for the housing including opposite lateral pivotal trunnions for the housing for tiltingly mounting the housing with its closed end depressed and its open discharge end elevated when the housing is in operating cooking position, a guard plate mounted in the housing adjacent to the closed end and having an opening therethrough, spacing means projecting from said plate engageable with the closed end and defining therewith a driving compartment, a bearing socket extending outwardly from said closed end, a conveyor shaft mounting structure in said compartment, comprising a socket member having an irregular inner wall surface and a round outer surface rotatably extending in the plate opening, said socket structure having an integral stub axle shaft, a driving sprocket fixedly mounted on said shaft adjacent to the socket, said shaft being rotatively received in said bearing socket, a rotary screw conveyor within the housing of a diameter slightly less than that of the housing, and with one end of its shaft irregularly shaped to non-rotatably engage in the socket member in said plate opening, the conveying portion extending from said plate to the discharge end of the housing, a driving motor carried by said closed end and having a drive shaft carrying a sprocket connected by a sprocket chain with said first mentioned sprocket for rotating said conveyor, the conveyor shaft being normally retained by gravity in the irregularly shaped socket member, the liquid level of the cooking bath terminates short of the open discharge end, when the housing is in cooking position, controllable heating means carried by the housing for maintaining the bath at different temperatures, and the conveyor being releasable from its supporting socket and housing by the reversal of the slope of the housing from cooking position to discharging position by lowering its discharge end.

References Cited in the file of this patent

UNITED STATES PATENTS

| | | |
|---|---|---|
| 1,524,838 | Muller | Feb. 3, 1925 |
| 2,299,080 | De Back | Oct. 20, 1942 |
| 2,587,556 | Weiss et al. | Feb. 26, 1952 |
| 2,643,603 | Balluteen | June 30, 1953 |
| 2,732,789 | Herberg | June 31, 1956 |